(12) United States Patent
Lee et al.

(10) Patent No.: US 7,720,150 B2
(45) Date of Patent: May 18, 2010

(54) PIXEL DATA SELECTION DEVICE FOR MOTION COMPENSATED INTERPOLATION AND METHOD THEREOF

(75) Inventors: Sung-hee Lee, Suwon (KR); Heon-hee Moon, Sungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 997 days.

(21) Appl. No.: 10/219,295

(22) Filed: Aug. 16, 2002

(65) Prior Publication Data
US 2003/0103568 A1    Jun. 5, 2003

(30) Foreign Application Priority Data
Nov. 30, 2001   (KR)   .................. 2001-75535

(51) Int. Cl.
    *H04B 1/66* (2006.01)
(52) U.S. Cl. .................................. 375/240.16
(58) Field of Classification Search ............ 375/240.14, 375/240.15, 240.16, 240.1, 240.13, 240.12, 375/240.17, 240.18, 240.24, 240.25, 240.26; 348/448, 459, 699; 382/236; *H04B 1/66*
See application file for complete search history.

(56) References Cited

U.S. PATENT DOCUMENTS

| | | | | |
|---|---|---|---|---|
| 5,198,901 A | * | 3/1993 | Lynch .................... | 375/240.14 |
| 5,317,397 A | * | 5/1994 | Odaka et al. ........... | 375/240.15 |
| 5,400,087 A | * | 3/1995 | Uramoto et al. ......... | 348/699 |
| 5,495,300 A | * | 2/1996 | de Haan et al. ......... | 348/699 |
| 5,534,946 A | * | 7/1996 | De Haan et al. ......... | 348/619 |
| 5,539,469 A | * | 7/1996 | Jung ...................... | 375/240.14 |
| 5,550,591 A | * | 8/1996 | Rim et al. .............. | 375/240.14 |
| 5,565,922 A | * | 10/1996 | Krause .................. | 375/240.14 |
| 5,719,631 A | * | 2/1998 | Pandel ................... | 375/240.15 |
| 5,754,240 A | * | 5/1998 | Wilson .................. | 375/240.15 |
| 5,825,418 A | * | 10/1998 | Song et al. ............. | 375/240.15 |
| 5,909,511 A | * | 6/1999 | Yoshimoto ............... | 382/236 |
| 5,995,154 A | * | 11/1999 | Heimburger ............... | 348/448 |
| 6,058,212 A | * | 5/2000 | Yokoyama ............... | 382/236 |
| 6,188,727 B1 | * | 2/2001 | Lee ...................... | 375/240.03 |
| 6,504,872 B1 | * | 1/2003 | Fimoff et al. .......... | 375/240.27 |
| 6,658,059 B1 | * | 12/2003 | Iu et al. ............... | 375/240.16 |
| 7,006,157 B2 | * | 2/2006 | Sohn .................... | 348/699 |
| 7,333,545 B2 | * | 2/2008 | Duruoz et al. ......... | 375/240.25 |

(Continued)

FOREIGN PATENT DOCUMENTS

CN    1170317 A    1/1998

(Continued)

*Primary Examiner*—Tung Vo

(57) ABSTRACT

A pixel data selection device for motion compensated interpolation and a method thereof selects pixel data in adjacent frame/fields. First and second storage portions respectively store first pixel data corresponding to a motion vector of a first frame/field that is obtained by delaying an input frame/field and second pixel data corresponding to the motion vector of a second frame/field that is obtained by delaying the first frame/field one or more times. First and second pixel data extracting portions extract individual pixel data from the first and the second pixel data corresponding to a candidate motion vector. First and second optimum pixel outputting portions output optimum pixel data for motion compensation from the extracted individual pixel data. By selecting the optimum pixel data from the adjacent frame/field of an interpolated frame/field having a current block and candidate blocks corresponding to a plurality of motion trajectories, occurrence of blocking artifacts due to inaccurate estimate of motion vectors can be reduced.

43 Claims, 7 Drawing Sheets

U.S. PATENT DOCUMENTS

| | | | |
|---|---|---|---|
| 7,336,838 B2 * | 2/2008 | Hur et al. | 382/236 |
| 2002/0036705 A1 * | 3/2002 | Lee et al. | 348/459 |

FOREIGN PATENT DOCUMENTS

| | | |
|---|---|---|
| EP | 0874523 A1 | 10/1998 |
| JP | 61-159880 | 7/1986 |
| JP | 06-054302 | 2/1994 |
| JP | 06-326975 | 11/1994 |
| WO | 01/35657 | 5/2001 |

* cited by examiner

PIXEL DATA SELECTION DEVICE FOR MOTION COMPENSATED INTERPOLATION AND METHOD THEREOF

CROSS-REFERENCE TO RELATED APPLICATIONS

This application claims the benefit of Korean Application No. 2001-75535, filed Nov. 30, 2001, in the Korean Industrial Property Office, the disclosure of which is incorporated herein by reference.

BACKGROUND OF THE INVENTION

1. Field of the Invention

The present invention relates to a pixel data selection device for motion compensated interpolation and a method thereof, and more particularly, to a pixel data selection device and method in a video signal conversion.

2. Description of the Related Art

A frame rate conversion (FRC) relates to a conversion of the number of frame outputs per second. A frame rate is generally expressed as a unit of 'Hz'. The frame rate conversion is required in different frame rates of video signals. For example, when one wants to watch a film with a 24 Hz frame rate in a TV screen with a 30 Hz frame rate, the 24 Hz frame rate of the film has to be converted to the 30 Hz frame rate of the TV screen by frame repetition and 3-2 pull-down methods.

The frame rate conversion includes an up-conversion and a down-conversion to increase and decrease the frame rate, respectively. In the down-conversion, aliasing generated during down-sampling of the video signals can be easily prevented by using a low-frequency filtering and sampling. In the up-conversion, however, a nonexistent frame has to be constructed in a temporal axis, and the aliasing generated during compensation of the non-existent frame is hardly controllable since there is no limit in determining a bandwidth of an input video signal. In addition, excessive high frequency components on a spatial axis, or excessive motions on the temporal axis further deteriorate an interpolation efficiency of the non-existent frame.

A conventional FRC algorithm is divided into a motion compensation type and a non-motion compensation type according to whether the algorithm uses motion information among frames during interpolation. The non-motion compensation type of the FRC algorithm includes the frame repetition method, a linear or non-linear time/space filter method and a simple motion interpolation method using a motion detection method in a local motion area.

The frame repetition method simply repeats a preceding frame. In other words, the frame repetition method does not use the motion information. The frame repetition method is one of conventional methods to be implemented in a hardware level. However, when one frame is converted into another frame with a different frame rate, an annoying view like motion jitter or blurring occurs.

In order to overcome the above problems, a time/space filter interpolation method has been suggested. In the time/space filter interpolation method, a time/space filter is used to filter neighboring frames of an interpolated frame. This method, however, cannot prevent the aliasing during the interpolation. If an input image contains excessive high frequency components on a spatial axis, the blurring occurs in the interpolated frame.

The motion interpolation method is based on both a motion-compensated interpolation (MCI) and a linear interpolation. This method detects a motion in a local area and simplifies computational complexities for motion compensation by applying the detected motion to the linear interpolation of adjacent frames. More specifically, the motion interpolation method performs the interpolation by using a median filter eliminating irregular motion vectors detected from a motion detecting process, and averaging the motion vectors along motion trajectories.

FIG. 1 is a block diagram showing a general structure of a conventional frame rate converting apparatus, and FIG. 2 is a view showing an image segmentation used in the conventional frame rate converting apparatus of FIG. 1.

Referring to FIG. 1, the conventional frame rate converting apparatus 100 includes an image segmentation portion 110, a motion estimation portion 120, a motion vector refinement portion 130 and a motion compensated-interpolation (MCI) portion 140. As shown in FIG. 2, the image segmentation portion 100 divides an image into a changed region and an unchanged region. The changed region is again divided into a covered region and an uncovered region, a stationary background region and a moving object region for more efficient motion estimation.

The motion estimation portion 120 estimates the motion in a unit of pixel or block. A motion vector of a block is generated by a block matching algorithm that is generally used in video coding. The block matching algorithm obtains the motion vector for each block based on an assumption that pixels within a certain sized block are moved at a constant rate, i.e., the pixels are moved without enlargement or reduction. The motion estimation in the pixel unit is performed in order to obtain the motion vector closer to a true image. For the motion estimation in a pixel unit, first, based on the assumption that the pixels within the block have a uniform motion, the motion vector of the block unit is obtained. Then, based on the motion vector of the block unit, a motion vector of each pixel of the block is obtained.

When a proper motion vector is not obtained, however, a visual effect would be less than when the motion information is not used at all. Accordingly, the motion vector refinement portion 130 refines the improper motion vector that is obtained from the motion estimation portion 120. The MCI portion 140 obtains the motion vector in a forward direction of the preceding and following frames of an image for interpolation. Then, by using the estimated motion vector, the image for interpolation is recognized according to the regions divided by the image segmentation portion 110. In other words, the MCI portion 140 compensates motions by using motion information between adjacent frames like the preceding and following frames of a certain image of a current frame to be interpolated.

And sometimes, an inaccurate result is obtained from the motion estimation due to the estimated motion vector that is different from a true motion vector. When there is inaccurate motion estimation by the MCI portion 140, blocking artifacts occur in interpolated images. Accordingly, after-process methods like an overlapped block motion compensation (OBMC) method are used to remove the blocking artifacts. The OBMC method, however, is only effective when the artifacts of pixel data change edges of the block irregularly. In a format conversion like deinterlacing and the frame/field rate conversion (FRC), the after-process methods such as an OBMC method are not effective in blocking artifacts where the pixel data within the interpolated block is very quite different from that of the adjacent blocks.

SUMMARY OF THE INVENTION

The present invention has been made to overcome the above- and other problems of the related art, and accordingly, it is an object of the present invention to provide an apparatus and a method for motion compensated interpolation, which selects pixel data of a block for interpolation according to a plurality of motion trajectories.

Additional objects and advantages of the invention will be set forth in part in the description which follows and, in part, will be obvious from the description, or may be learned by practice of the invention.

The above and other objects may be achieved by providing a pixel data selection device for motion compensated interpolation according to an embodiment of the present invention. The device includes a first storage portion and a second storage portion respectively storing first pixel data and second pixel data, the first pixel data corresponding to a motion vector of a first frame/field that is obtained by delaying an input frame/field, the second pixel data corresponding to the motion vector of a second frame/field that is obtained by delaying the first frame/field one or more times, a first pixel data extract portion and a second pixel data extract portion respectively extracting individual pixel data from the first and the second pixel data corresponding to each candidate motion vector, and a first optimum pixel output portion and a second optimum pixel output portion outputting optimum pixel data for motion compensated interpolation from the extracted individual pixel data.

The candidate motion vector is a motion vector of a current block and an adjacent block or a motion vector extracted during motion estimation. The candidate motion vector reuses a global motion vector detected during motion analysis and a motion vector detected from a block of a preceding frame/field at the same location as a block of a following frame/field.

The first and the second pixel data extract portions extract the individual pixel data on the basis of a second candidate motion vector that is obtained by median filtering and/or average filtering of the candidate motion vector. The device includes a first delay portion outputting the first frame/field and a second delay portion outputting a second frame/field that is obtained by first-delaying the first frame/field.

The first and the second pixel data extract portions selectively output the individual pixel data with respect to a block of a zero (0) candidate motion vector. The first and second pixel data extract portions extract the individual pixel data by estimating a motion trajectory with the candidate motion vector.

The first and the second optimum pixel output portions are a median filter that outputs a median value of the individual pixel data as the optimum pixel data. The first and the second optimum pixel data output portions determine the individual pixel data closest to an average of the individual pixel data as the optimum pixel data for motion compensated interpolation and outputs the determined pixel data for motion compensated interpolation.

The second storage portion stores the second pixel data corresponding to the motion vector of the second field, the second field being obtained by second-delaying the first field and having the same characteristic as the first field corresponding to the first pixel data stored in the first storage portion. The device includes a first delay portion outputting the first field, which is obtained by first-delaying the input field and a second delay portion outputting the second field, which is obtained by second-delaying the first field.

The above and other objects may be achieved by providing a method of selecting pixel data for motion compensated interpolation according to another embodiment of the present invention. The method includes extracting individual pixel data corresponding to one or more candidate motion vectors from first pixel data of an input first frame/field and second pixel data of an input second frame/field and outputting optimum pixel data for motion compensated interpolation from the extracted individual pixel data.

Each candidate motion vector is a motion vector of a current block and an adjacent block disposed adjacent to the current block of an interpolated frame/field, or a motion vector extracted during motion estimation. The candidate motion vector is a global motion vector detected during motion analysis and a motion vector detected from a block of a preceding frame/field at the same location as a block of a following frame/field.

The extracting of the pixel data includes extracting the individual pixel data on the basis of a second candidate motion vector that is obtained by median-filtering and/or average-filtering the candidate motion vectors. The extracting of the individual pixel data includes outputting the first frame/field, which is obtained by delaying an inputted frame once and outputting the second frame/field, which is obtained by delaying the first frame/field once.

The extracting of the pixel data includes selectively outputting the pixel data for motion compensated interpolation with respect to a block of zero (0) candidate motion and extracting the individual pixel data by estimating a motion trajectory corresponding to the candidate motion vector.

The outputting of the optimum pixel data includes extracting a median value of the individual pixel data and determining the individual pixel data closest to an average of the individual pixel data as the optimum pixel data for motion compensated interpolation, and outputting the determined pixel data for motion compensated interpolation.

The extracting of the pixel data includes extracting the pixel data for the candidate motion vector from the first pixel data and the second pixel data, the first pixel data being of the first field, and the second pixel data being of the second field that is adjacent to the first field and has the same characteristic as the first field.

By selecting the pixel data from the adjacent frame/field to interpolate the current block of an interpolated frame/field in accordance with a plurality of motion trajectories corresponding to the current blocks and candidate blocks, the occurrence of block artifacts, which are caused due to inaccurate estimation of a motion vector, can be prevented. Also, since all available motion trajectories are obtained in the candidate motion vectors without requiring additional processes, the hardware for the motion compensated interpolation is simplified.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
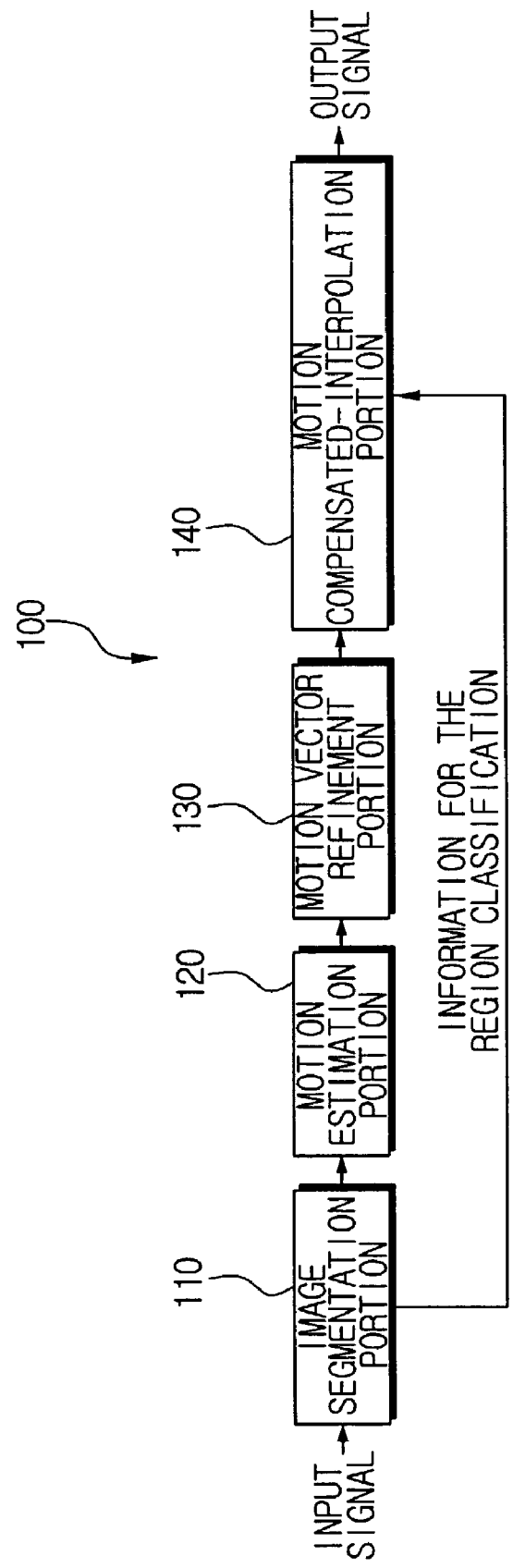
FIG. 1 is a block diagram of a conventional frame rate converting apparatus.
Figure 2:
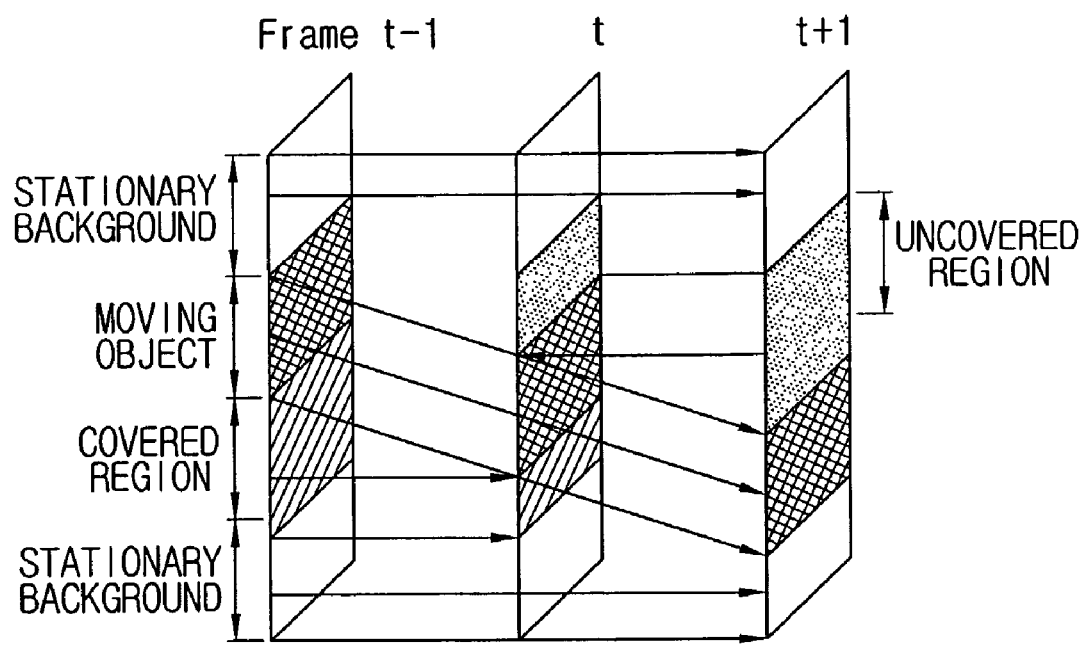
FIG. 2 is a view showing an image segmentation used in the conventional frame rate converting apparatus of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
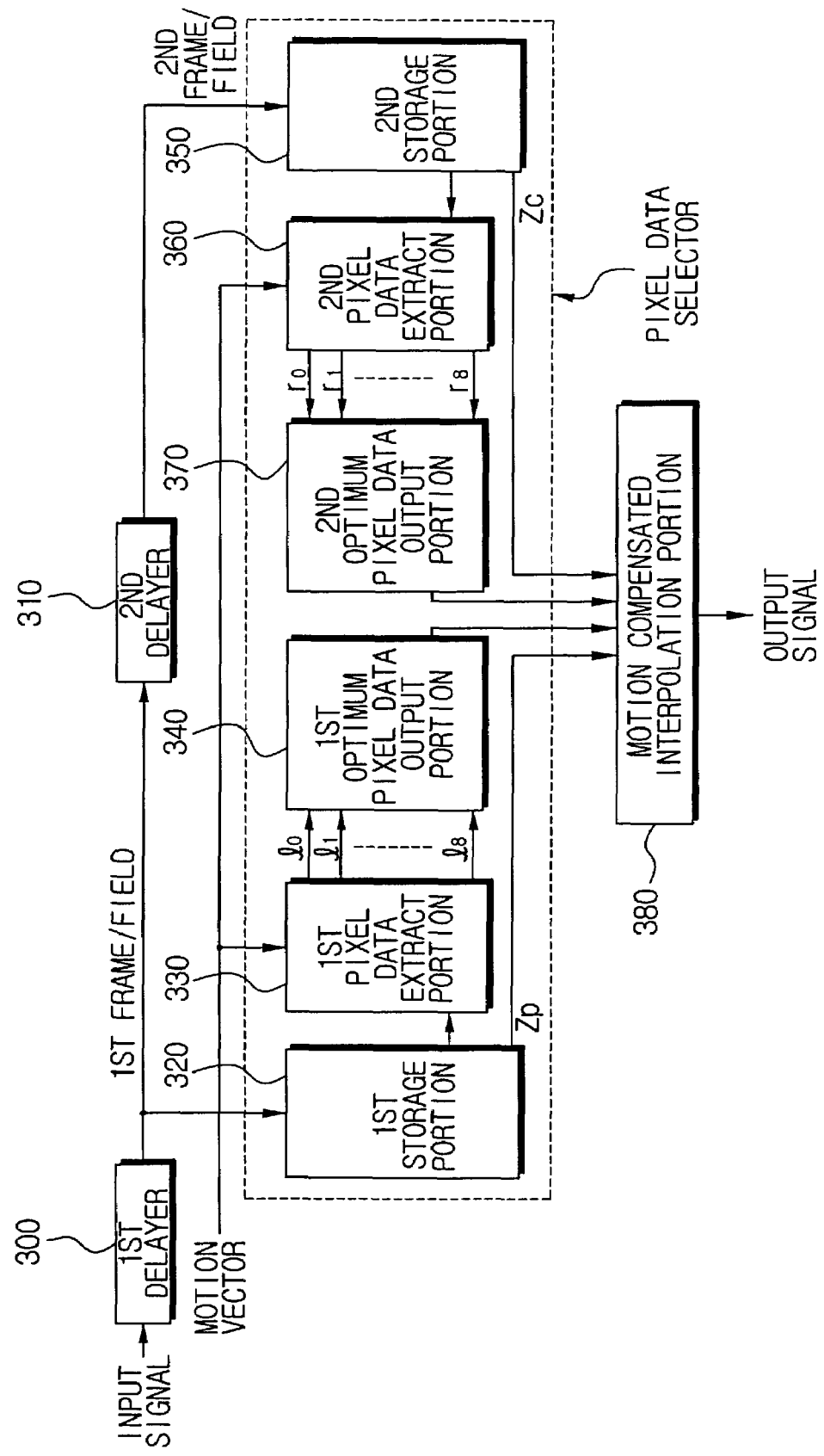
FIG. 3 is a block diagram showing a pixel data selection device for motion compensated interpolation according to an embodiment of the present invention.

An embodiment of the present invention will now be described with reference to the drawings. FIG. 3 is a block diagram of a pixel data selection device for motion compensated interpolation according to the embodiment of the present invention.

Referring to FIG. 3, the pixel data selection device includes a first delayer 300, a second delayer 310, a first storage portion 320, a first pixel data extract portion 330, a first optimum pixel data output portion 340, a second storage portion 350, a second pixel data extract portion 360, a second optimum pixel data output portion 370 and a motion compensated-interpolation (MCI) portion 380.

The first delayer 300 first delays the input frame/field once and outputs a resultant first frame/field. The second delayer 310 delays the first frame/field outputted from the first delayer 300 and outputs a resultant second frame/field. In an interlaced scanning method, if the first field represents an odd-numbered field, the second field represents an even-numbered field, and vice versa.

As the odd and even fields are inputted alternatively according to the interlaced scanning method, the first delayer 300 outputs the first field that is delayed from the input field. For example, if the input field is an odd field, the first delayer 300 outputs an even first field. Likewise, if the input field is an even field, the first delayer 300 outputs an odd first field. The second delayer 310 outputs the second field that is further delayed from the first field. As a result, the second field becomes an odd second field or even second field that corresponds to the even first field or odd first field output from the first field.

The first storage portion 320 stores the first pixel data corresponding to a motion vector of the first frame/field that is delayed from the input frame/field. The first pixel data extract portion 330 extracts individual pixel data corresponding to candidate motion vectors from the stored first pixel data of the first frame/field. The first pixel data extract portion 330 can also extract the individual pixel data corresponding to second candidate motion vectors which are obtained by median-filtering or average-filtering certain candidate motion vectors.

Here, the certain candidate motion vector can be a motion vector corresponding to a current block and adjacent blocks disposed adjacent to the current block of a current frame/field to be interpolated, or a plurality of motion vectors extracted during the motion estimation. Alternatively, a global motion vector detected during motion analysis estimation and a local motion vector detected from a block of a preceding frame/field at the same location as a block of a following frame/field can also be re-used as the candidate motion vector.

Figure 4:
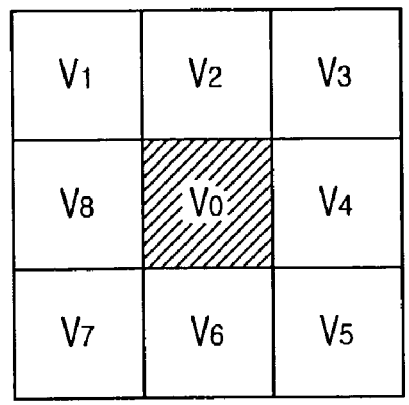
FIG. 4 is a view showing motion vectors of a current block and candidate blocks of an interpolated frame/field in the motion compensated interpolation of FIG. 3.

FIG. 4 is a view showing the motion vectors of the current block and candidate blocks. The motion vectors are used to construct the current block to be interpolated in the motion compensated interpolation.

When the motion estimation is inaccurate, blocking artifacts occur in an interpolated image. In order to eliminate the blocking artifacts, motion trajectories of the current block and the candidate block have to be taken into account in the motion compensated interpolation.

Referring to FIG. 4, the current block of the interpolated frame/field to be interpolated is denoted as $V_0$, and the candidate blocks are denoted as $V_i$ (i=1, 2, 3, 4, 5, 6, 7, 8). Provided that a movement within blocks is smooth, if the estimation of the motion vector of the current block is inaccurate, the inaccurate motion vector is replaced by an accurately estimated motion vector of the candidate block. That is, the inaccurate motion vector of the current block is replaced by the motion vector of the candidate block that has the least sum of absolute difference (SAD) among the motion vectors obtained from the candidate blocks.

In this embodiment, the pixel data corresponding to the motion vectors are extracted by using the motion vectors of the current block and the candidate blocks (FIG. 4). However, the pixel data corresponding to the motion vectors can also be extracted by using the second candidate motion vectors.

Figure 5:
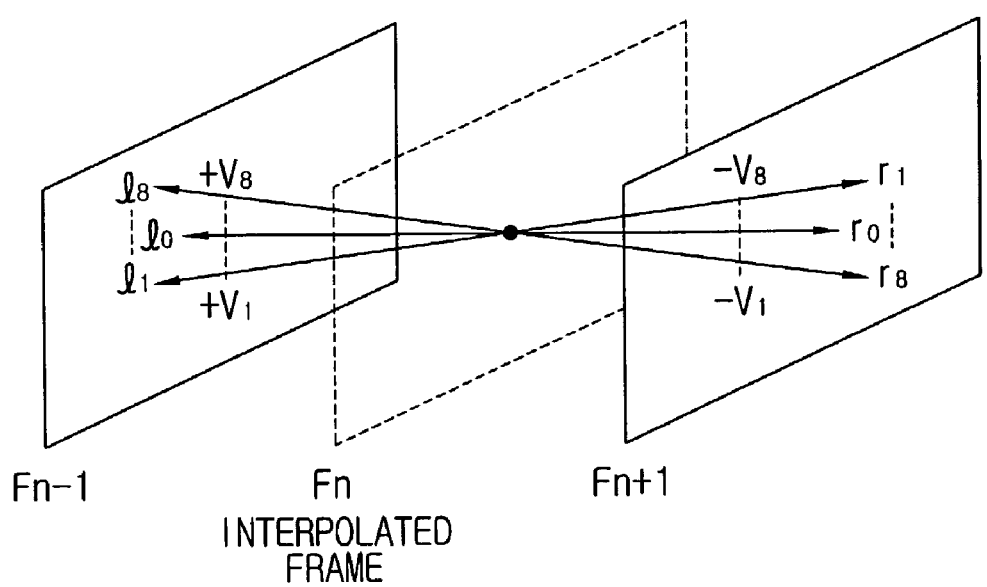
FIG. 5 is a view showing each motion trajectory of the current block and the candidate blocks to be interpolated in the motion compensated interpolation of FIG. 3.

FIG. 5 is a view showing the motion trajectory corresponding to the current block and the candidate blocks of the interpolated frame/field that is to be interpolated by using the estimated motion vectors of the current block and the candidate blocks.

As shown in FIG. 5, among the adjacent frames, $F_{n-1}$ is a (n−1)th frame, $F_n$ is a (n)th frame, and $F_{n+1}$ is a (n+1)th frame. $F_{n-1}$ and $F_{n+1}$ are a preceding frame and a following frame, respectively, while $F_n$ corresponds to the interpolated frame that is to be interpolated.

Conventionally, motion compensation was made with one motion trajectory for each block. If one of the estimated motion vectors is inaccurate, the block to be interpolated generates the blocking artifacts. Accordingly, in order to reduce an estimation error, the motion vectors have to be obtained through the estimation of the motion trajectories based on motion vector fields that are distributed in a denser pattern.

However, it requires complex computational requirements and establishment of hardware in order to obtain the densely distributed motion vector fields. Accordingly, instead of employing additional processes to add a plurality of motion trajectories applied to the current block to be interpolated, a simple construction having already used motion vectors, which are already estimated and used in the input frame/field will be used in this embodiment.

As shown in FIG. 3, the first optimum pixel data output portion 340 outputs the optimum pixel data from the individual pixel data extracted from the first pixel data extract portion 330. The first optimum pixel data output portion 340 can use a median filter that selects a median value among a plurality of individual pixel data. Accordingly, the first optimum pixel data output portion 340 uses the median filter to select the median value, to thereby output the optimum pixel data for motion compensated interpolation in consideration of a smooth motion trajectory among the blocks.

The first optimum pixel data output portion 340 determines the individual pixel data, which is the closest to the average value of the plurality of individual pixel data, as the optimum pixel data, and outputs the determined pixel data. If a complicated motion rather than a translation (linear) motion exists in a motion compensation process, instead of using a complicated motion vector detected by the block matching algorithm, the first optimum pixel data output portion 340 determines the pixel data, which does not use the motion information, as the optimum pixel data and outputs the determined pixel data. Accordingly, the pixel data having a 'zero (0)' motion vector can be selected as the optimum pixel data.

In the same way as described above, the optimum pixel data of the second frame/field is also selected. The second delayer 310 delays the first frame/field outputted from the first delayer 300 and outputs the resultant second frame/field.

The second storage portion 350 stores the second pixel data corresponding to the motion vectors of the second frame/field that is delayed from the first frame/field. The second pixel data extract portion 360 extracts individual pixel data corresponding to respective candidate motion vectors from the stored second pixel data of the second frame/field. The second pixel data extract portion 360 outputs the extracted pixel data for the block having the zero (0) candidate motion vector. The second pixel data extract portion 360 can also extract the individual pixel data through the estimation of the motion trajectory with the candidate motion vectors.

The second optimum pixel data output portion 370 outputs the optimum pixel data from the individual pixel data extracted from the second pixel data extract portion 360. The second optimum pixel data output portion 370 can use the median filter that outputs the median value among the plurality of the individual pixel data. By selecting the median value by using the median filter, the second optimum pixel data output portion 370 outputs the compensation pixel data in consideration of the smooth motion trajectory among the blocks. Further, the second optimum pixel data output portion 370 can determine the individual pixel data, which is the closest to the average of the plurality of the individual pixel data, as the compensation pixel data and output the determined compensation pixel data.

Figure 6:
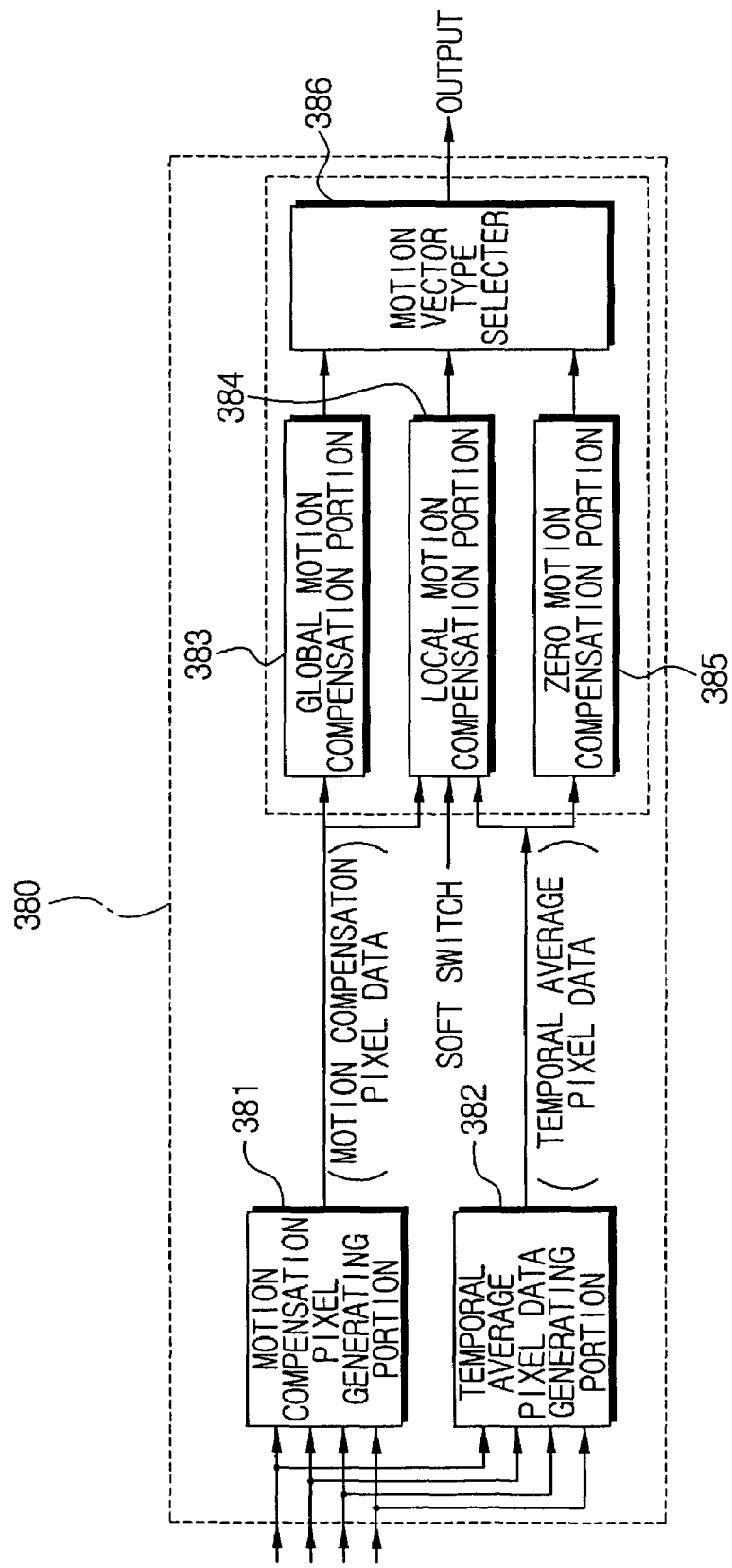
FIG. 6 is a block diagram showing an a motion compensated-interpolation portion of the pixel data selection device of FIG. 3.

FIG. 6 is a block diagram showing the motion compensated-interpolation portion according to another embodiment of the present invention in detail. Referring to FIG. 6, the MCI portion 380 includes a motion compensation pixel data generating portion 381, a temporal average pixel data generating portion 382, a global motion compensation portion 383, a zero motion compensation portion 385, a local motion compensation portion 384, and a motion vector type selector 386.

The MCI portion 380 receives outputs from the first storage portion 320, and the first optimum pixel data output portion 340 corresponding to the first frame/field, the second storage portion 350, and the second optimum pixel data output portion 370 corresponding to the second frame/field, and then obtains interpolated fields or frames through different compensation processes according to the type of the motion blocks.

The MCI portion 380 performs the motion compensation by adaptively applying the motion compensation methods according to information about the motion vectors outputted from the pixel selection device. The motion compensation pixel data generating portion 381 generates motion compensation pixel data with an average value as well as a median-value obtained by median-filtering the pixel data of the preceding and following frames. The motion compensation pixel data generating portion 381 receives the outputs from the first and second storage portions 320, 350 and the first and second optimum pixel data outputting portions 340, 370 and generates the motion compensation pixel data. The motion compensation pixel data generating portion 381 generates the motion compensation pixel data by:

$$P_{mc}(x) = \text{MEDIAN}\{l_{med}(x), r_{med}(x), (f_{n-1}(x) + f_n(x))/2\}, \quad \text{Formula 1}$$

wherein $P_{mc}(x)$ is the motion compensation pixel data, $l_{med}(x)$ is a median of the pixel data of the candidate blocks of the preceding frame/field, $r_{med}(x)$ is a median of the pixel data of the candidate blocks of the following frame/field, and x and n are the spatial and time domain indices, respectively.

When there is no motion, the temporal average pixel data generating portion 382 generates temporal average pixel data based on a time average instead of the motion vectors. The temporal average pixel data generating portion 382 receives the outputs from the first and the second storage portions 320, 350 and the first and second optimum pixel data outputting portions 340, 370 and determines the temporal average pixel data by:

$$P_{avg}(x) = \text{MEDIAN}\{f_{n-1}(x) + f_n(x), (l_{med}(x) + l_{med})/2\}, \quad \text{Formula 2}$$

wherein $P_{avg}(x)$ is the temporal average pixel data.

For example, when the motion vectors are accurate, the MCI portion 380 performs the motion compensation using the motion vectors. In this case, the motion compensation pixel data is needed. When there is no motion, instead of using the motion vectors, the MCI portion 380 performs the motion compensation simply using the averages along the temporal axis, instead of using the motion vectors. In this case, the temporal average pixel data is needed.

Also, there is a situation where the estimated motion vectors are inaccurate although a motion occurs. In this case, the MCI portion 380 soft-switches to a median value between the motion compensation pixel data and the temporal average pixel data according to the accuracy of the estimated motion vectors.

The global motion compensation portion 383 performs the motion compensation by using the motion vectors. The global motion compensation portion 383 uses the optimum pixel data that is selected by the pixel data selection device for motion compensation. The 'global motion' means an entire scene (image) moving in a direction at a constant speed. In a case of the global motion, substantially the same compensation effect can be obtained by applying the general MCI method.

If the current block is the global motion type, the interpolated frame $f_i(x)$ between the two adjacent frames is determined by:

$$f_i(x) = \frac{1}{2}\left[f_{n-1}\left(x + \vec{V}\right) + f_n\left(x - \vec{V}\right)\right], \quad \text{Formula 3}$$

wherein V is motion vector of the current block, and $f_i$, $f_{n-1}$, and $f_n$ are, respectively, the interpolated frame, the preceding and following frames being consecutively input.

Meanwhile, the right side of the above equation (Formula 3) can be replaced by the output ($P_{mc}(x)$) of the motion compensation pixel data generating portion 381. In this case, the output of the global motion compensation portion 383 is the left side ($f_i(x)$) of the above equation (Formula 3).

For the block that has no motion, the zero motion compensation portion 385 performs the compensation not by using the motion vector, but by simply obtaining an average on the temporal axis. The zero motion compensation portion 385 receives the pixel data selected by the pixel data selection device, and performs the compensation by using the time average of the pixel data.

If the current block is the zero motion type block, the current block of the interpolated frame ($f_i(x)$) between the two adjacent frames is determined by:

$$f_i(x) = \frac{1}{2}[f_{n-1}(x) + f_n(x)].$$  Formula 4

The right side of the above equation (Formula 4) can be replaced by the output ($P_{avg}(x)$) of the time average pixel data generating portion 382, and in this case, the output of the zero motion compensation portion 385 is $f_i(x)$.

The local motion compensation portion 384 performs the compensation with respect to local motions. The local motions are not estimated through the motion of the moving object or block matching. In this case, according to the accuracy of the estimated motion vectors, the local motion compensation portion 384 soft-switches to the median value between the motion compensation pixel data and the temporal average pixel data. Since the motion vectors detected from the local motion are sometimes inaccurate, and thus the blocking artifacts can occur when the general MCI method is applied. An adaptive MCI method is used to reduce the block artifacts.

If the current block is a local motion type block, the pixel data for interpolation is determined by:

$$f_i(x)=M \cdot P_{avg}+(1-M) \cdot P_{mc}, 0 \leq M \leq 1.$$  Formula 5

Then, by using the motion vectors of the adjacent blocks, the motion compensation pixel data, is determined from the preceding frame and the current frame, and the median value of the respective pixel data is obtained. The median value $l_{med}, r_{med}$ is obtained by:

$$l_{med}(x)=\text{MEDIAN}\{l_i\},$$

$$r_{med}(x)=\text{MEDIAN}\{r_i\}, i=0, 1, \ldots, N.$$  Formula 6

By the above equations (Formula 6), the smoothing effect of the motion vectors is obtained in a case that the motion vector of the current block is inaccurate.

Further, $l_i$ and $r_i$ for $l_{med}$ and $r_{med}$ are obtained by:

$$l_i(x)=f_{n-1}(x+\vec{V_i}),$$

$$r_i(x)=f_n(x-\vec{V_i}), i=0, 1, \ldots, N$$  Formula 7 where $\vec{V_i}$ is the motion vectors of the current block and the candidate blocks.

Also, the motion analysis portion (not shown) calculates the correlation of the motion vectors of the candidate blocks, thereby determining a soft switching value M. The determined soft switching value M is used between the motion compensation pixel data and the non-motion compensation pixel data. The soft switching value M is determined by:

$$M = \sum_{i=0}^{8} |\vec{V_i} - \vec{V_0}|.$$  Formula 8

If the current block is a local motion type block, the local motion compensation portion 384 determines the pixel data, which is to be interpolated, between $P_{mc}$ and $P_{avg}$ according to the soft switching value (M).

When the motion vector type is determined by the motion analysis portion (not shown), the motion vector type selector 386 selects one of the pixel data of the global motion compensation portion 383, local motion compensation portion 384 and zero motion compensation portion 385 each corresponding to an inputted motion vector type. Accordingly, the MCI portion 380 adaptively performs the compensation by selectively applying the compensation method according to the selected motion vector type.

Figure 7:
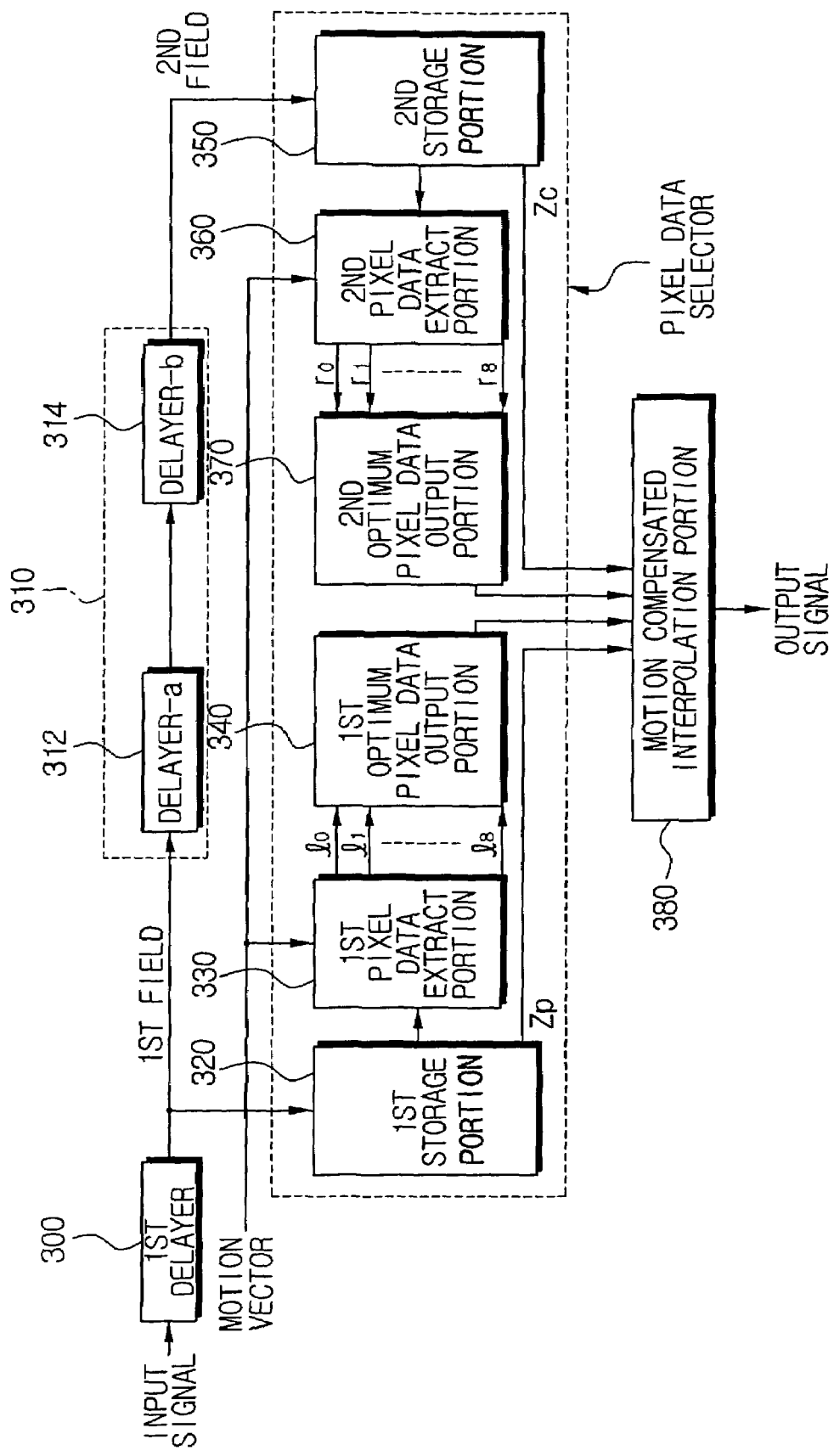
FIG. 7 is a block diagram showing a pixel data selection device for motion compensated interpolation to obtain an adjacent field that has the same characteristic as a current field according to another embodiment of the present invention.

FIG. 7 is a block diagram of the pixel data selection device for motion compensation in the neighboring fields having the same identical characteristic.

Referring to FIG. 7, the pixel data selection device includes the first delayer 300, the second delayer 310, the first storage portion 320, the first pixel data extract portion 330, the first optimum pixel data output portion 340, the second storage portion 350, the second pixel data extract portion 360, the second optimum pixel data output portion 370 and motion compensated-interpolation portion 380.

FIG. 7 is a block diagram of the pixel data selection device for motion compensated interpolation in the neighboring fields having the same identical characteristic. Here, description about the like elements as those of FIG. 3 will be omitted. The difference between FIGS. 3 and 7 is that while FIG. 3 shows the pixel selection device that selects pixel data for motion compensation between any two adjacent frame/fields, FIG. 7 shows the pixel data selection device that selects pixel data for motion compensation between the two neighboring fields having the same identical characteristic.

Here, the 'two neighboring fields having the same identical characteristic' means that if the first field, which is once delayed from the input field, is an odd field, the second field is an odd field that is second time delayed from the first field. Likewise, if the first field is an even field, the second field becomes an even field.

The first delayer 300 first delays the input field and outputs the first field as an odd first field. Then, the second delayer 310 second time delays the odd first field and outputs the second field as the odd second field.

The second delayer 310 has a delayer-a 312 and a delayer-b 314. The delayer-a 312 delays the odd first field and outputs the even second field while the delayer-b 314 delays the even field from the delayer-a 312 one more time and outputs the odd second field. In this way, the first and the second pixel data extract portions 330, 360 extract the pixel data for motion compensation, from the adjacent fields having the same identical characteristics, i.e., from the odd first field and odd second field, or from the even first field and even second field.

Figure 8:
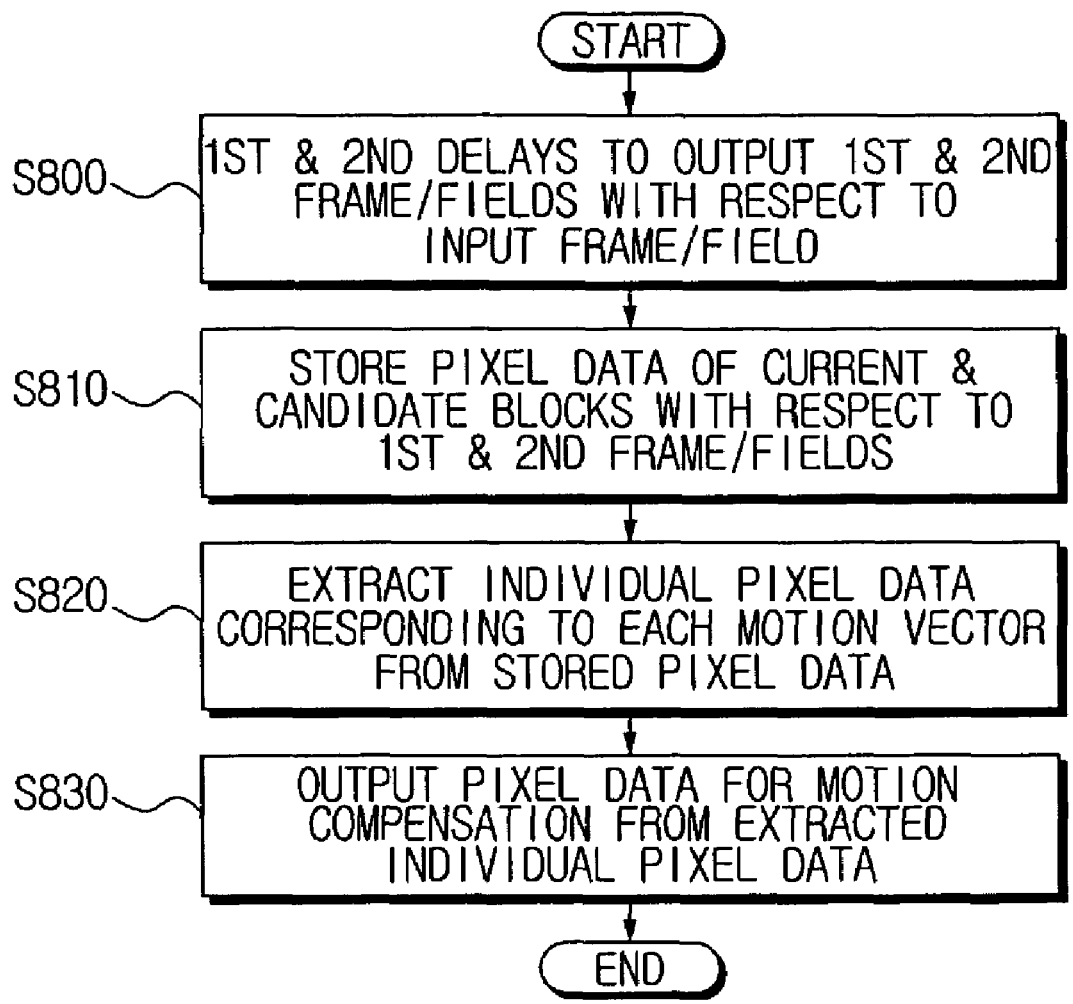
FIG. 8 is a flowchart explaining a method of selecting pixel data for motion compensated interpolation of FIGS. 3 through 7.

FIG. 8 is a flowchart showing a method of selecting the pixel data for motion compensated interpolation according to another embodiment of the present invention.

Referring to FIG. 8, the input frame/field is delayed by first and second times to be output as the first and second frame/fields, respectively, in operation S800. The first delayer 300 delays the input frame/fields and outputs the resultant field, i.e., the first frame/field. The second delayer 310 secondly delays the first frame/field output from the first delayer 300 and outputs the second frame/field. In the interlaced scanning method, if the first field is an odd field, the second field will be the even field corresponding to the odd first field, and if the first field is an even field, the second field will be the odd field corresponding to the even first field.

The first and second storage portions 320, 350 store the first pixel data and the second pixel data in operation S810. The first pixel data corresponds to the motion vector of the first frame/field, which is firstly delayed from the input frame/field by the first delayer 300, while the second pixel data corresponds to the motion vector of the second frame/field, which is secondly delayed from the first frame/field by the second delayer 310. When the motion estimation is inaccurate, the blocking artifacts occur in the interpolated image. In order to reduce the occurrence of the blocking artifacts, the pixel data is determined by taking the motion trajectory of the current block and the candidate blocks into account in motion compensation.

The individual pixel data corresponding to the candidate motion vector is extracted from the first and the second pixel data in operation S820. Here, the candidate motion vector can be the motion vector of the current block and the candidate blocks, or it can be a plurality of candidate motion vectors extracted during the motion estimation. The global motion vector detected from the motion analysis and the local motion vector detected from the preceding frame/field at the same location as a block of the following (current) frame/field can also be re-used as the candidate motion vector.

When the individual pixel data are extracted operation in S820, the optimum pixel data for motion compensation are output from the extracted individual pixel data in operation S830. Here, the optimum pixel data for motion compensation can be output by using a median filter which outputs the median pixel data of the plurality of individual pixel data. By selecting the median pixel data through the median filter, the optimum pixel data for motion compensation can be output in consideration of the smooth motion trajectory. Also, the individual pixel data that is the closest to the average of the plurality of individual pixel data can be determined and output as the optimum pixel data for motion compensation.

Although one method selects the pixel data for motion compensation from the adjacent fields having the identical characteristic, and the other method selects the pixel data for motion compensation from the two adjacent frame/fields, these two methods are based on the same principle. Accordingly, the pixel data for motion compensation can be selected from the fields of identical characteristic through operations S810 through S830.

According to the pixel data selection device for motion compensated interpolation and a method thereof, by selecting pixel data from the adjacent frame/fields to interpolate the current block in consideration of the plurality of motion trajectories, the occurrence of blocking artifacts due to inaccurate estimation of motion vectors can be reduced. Also, since all motion trajectories about the current block and the candidate blocks are taken into account without requiring additional processes, the hardware for the motion compensated interpolation is simplified. Also, by analyzing the motion vector fields and categorizing the motions of the respective blocks into 'global', 'local' and 'zero' blocks, processes can be performed adaptively according to the categorized blocks, and therefore, the occurrence of the blocking artifacts due to inaccurate estimation of the motions can be reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pixel data selection device for motion compensated interpolation, comprising:
   a first storage portion and a second storage portion respectively storing first pixel data and second pixel data, the first pixel data corresponding to a first motion vector of a first frame/field that is obtained by delaying an input frame/field, the second pixel data corresponding to a second motion vector of a second frame/field that is obtained by delaying the first frame/field one or more times;
   a first pixel data extracting portion and a second pixel data extracting portion respectively extracting individual pixel data from the stored first and the second pixel data corresponding to a plurality of candidate motion vectors, the stored first and second pixel data being stored in the respective first and second storage portions;
   a first optimum pixel output portion and a second optimum pixel output portion, each optimum pixel output portion outputting directly to a motion compensation interpolation portion optimum pixel data for the motion compensated interpolation from the extracted individual pixel data;
   a first delay portion outputting the first frame/field by delaying the input frame/field; and
   a second delay portion outputting a second frame/field by delaying the first frame/field,
   wherein the first and second pixel data extracting portions output extracted individual pixel data from the stored first and second pixel data to the first and second optimum pixel output portions, respectively, and the first and second optimum pixel output portions determine optimum pixel data based on the inputted individual pixel data inputted from the first and second pixel data extracting portions, respectively, and
   the motion compensation interpolation portion receives outputs directly from the first and second storage portions and the first and second optimum pixel output portions and generates motion compensation pixel data based on the outputs from the first storage portion, the second storage portion, the first optimum pixel output portion and the second optimum pixel output portion through a motion compensation process selected from a plurality of motion compensation processes according to a motion vector type.

2. The pixel data selection device of claim 1, wherein the motion compensation interpolation portion forms interpolated pixel data from the optimum pixel data, wherein the candidate motion vectors are motion vectors corresponding to a current block formed with the interpolated pixel data and an adjacent block disposed adjacent to the current block.

3. The pixel data selection device of claim 1, wherein the candidate motion vectors are a motion vector extracted during motion estimation of the input frame/field and used for forming the input frame/field.

4. The pixel data selection device of claim 1, wherein the candidate motion vectors are a global motion vector detected during motion estimation of the input frame/field and a local motion vector detected from a block of the first frame/field at the same location as a corresponding block of the second frame/field.

5. The pixel data selection device of claim 1, wherein the first and the second pixel data extracting portions extract the individual pixel data on the basis of a second candidate motion vector that is obtained by median-filtering and/or average-filtering of the candidate motion vectors.

6. The pixel data selection device of claim 1, wherein the first and the second pixel data extract portions selectively output pixel data a block having a zero candidate motion vector as the individual pixel data.

7. The pixel data selection device of claim of claim 1, wherein the first and second pixel data extract portions extract the individual pixel data by estimating a motion trajectory corresponding to respective ones of the candidate motion vectors.

8. The pixel data selection device of claim 1, wherein the first and the second optimum pixel data output portions determine the individual pixel data closest to an average of the individual pixel data as the optimum pixel data and output the determined pixel data for motion compensation.

9. The pixel data selection device of claim 1, further comprising a delayer delaying the first frame/field to generate the second field having the same characteristic as the first field.

10. The pixel data selection device of claim 9, wherein the delayer comprises:
the first delay portion outputting the first field, which is obtained by first-delaying the input field; and
the second delay portion outputting the second field, which is obtained by second-delaying the first field.

11. A method of selecting pixel data for motion compensated interpolation, comprising:
extracting individual pixel data corresponding to one or more candidate motion vectors from first pixel data of an input first frame/field and second pixel data of an input second frame/field, the first frame/field being a delayed original frame/field, the second frame/field being a delayed first frame/field;
outputting, via a first optimum pixel output portion and a second optimum pixel output portion which each directly output data to a motion compensation interpolation portion, optimum pixel data for the motion compensated interpolation from the extracted individual pixel data to form interpolated pixel data of an interpolate current block,
outputting the first frame/field, which is obtained by delaying an inputted frame once; and
outputting the second frame/field, which is obtained by delaying the first frame/field at least once,
wherein the individual pixel data extracted from the first and second pixel data is output to the first and second optimum pixel output portions, respectively, and the first and second optimum pixel output portions determine optimum pixel data based on the inputted individual pixel data inputted to the first and second optimum pixel output portions, and
wherein the motion compensation interpolation portion receives outputs directly from the first and second storage portions and the first and second optimum pixel output portions and generates motion compensation pixel data based on the outputs from the first storage portion, the second storage portion, the first optimum pixel output portion and the second optimum pixel output portion through a motion compensation process selected from a plurality of motion compensation processes according to a motion vector type.

12. The pixel data selection method of claim 11, further comprising:
selecting the candidate motion vectors from motion vectors corresponding to the current block and an adjacent block disposed adjacent the current block.

13. The pixel data selection method of claim 11, further comprising:
selecting the candidate motion vector from motion vectors extracted during motion estimation of the input first frame/field and the input second frame/field.

14. The pixel data selection method of claim 11, further comprising:
selecting the candidate motion vector from a global motion vector detected during motion analysis of the input first frame/field and the input second frame/field and a motion vector detected from a block of the input first frame/field at the same location as a block of the input second frame/field.

15. The pixel data selection method of claim 11, wherein the extracting of the pixel data comprises:
extracting the individual pixel data on the basis of a second candidate motion vector that is obtained by median filtering and/or average filtering the candidate motion vectors.

16. The pixel data selection method of claim 11, wherein the extracting of the pixel data comprises:
selectively outputting pixel data of a block having a zero candidate motion vector as the optimum pixel data.

17. The pixel data selection method of claim 11, wherein the extracting of the pixel data comprises:
generating the individual pixel data by estimating a motion trajectory corresponding to the candidate motion vectors.

18. The pixel data selection method of claim 11, wherein the outputting of the optimum pixel data comprises:
determining the individual pixel data closest to an average of the individual pixel data as the optimum pixel data for motion compensation; and
outputting the determined pixel data to form the current block.

19. The pixel data selection method of claim 11, wherein the extracting of the individual pixel data comprises:
extracting the individual pixel data corresponding to respective candidate motion vectors from the first pixel data and the second pixel data, the input second frame/field having the same characteristic as that of the input first field.

20. The pixel data selection method of claim 19, wherein the extracting of the individual pixel data comprises:
outputting the input first field, which is delayed from an input frame/field once; and
outputting the input second field, which is delayed from the input first frame/field at least once.

21. The pixel data selection method of claim 11, wherein the extracting of the individual pixel data comprises:
generating first individual pixel data extracted from the first pixel data corresponding to respective candidate motion vectors and second individual pixel data extracted from the second pixel data corresponding to respective candidate motion vectors.

22. The pixel data selection method of claim 21, wherein the outputting of the optimum pixel data comprises:
generating a first median value of the first individual pixel data and a second median value of the second individual pixel data; and
generating motion compensation pixel data having a third median value of a combination of the first median value, the second median value, and an averaging value of the first and second pixel data to form the interpolated pixel data.

23. The pixel data selection method of claim 22, wherein the outputting of the motion compensated pixel data comprises:
generating temporal average pixel data having an average value of the first individual pixel data and the second individual pixel data to form the interpolated pixel data.

24. The pixel data selection method of claim 23, wherein the outputting of the motion compensated pixel data comprises:
forming the interpolated pixel data by a combination of the motion compensation pixel data and the temporal average pixel data in a predetermined ratio.

25. The pixel data selection method of claim 21, wherein the outputting of the optimum pixel data comprises:
generating an average of the first pixel data and the second pixel data to form the interpolated block when the candidate motion vector represents no motion in the input first and second frames/fields corresponding to the current block.

26. A pixel data selection device for motion compensated interpolation to form an interpolated block, comprising:
a first delayer delaying an original frame/field to yield a first frame/field;
a second delayer delaying the first frame/field to yield a second frame/field;
a pixel data selector receiving the first frame/field and the second frame/field having candidate blocks corresponding to a plurality of candidate motion vectors of the interpolated block and selecting pixel data corresponding to the candidate blocks of the first frame/field and the second frame/field; and
a motion compensation interpolation portion forming the interpolated block in response to the selected pixel data,
wherein the pixel data selector includes a first optimum pixel output portion and a second optimum pixel output portion, each optimum pixel output portion outputting directly to the motion compensation interpolation portion optimum pixel data,
the pixel data corresponding to the candidate blocks of the first frame/field is inputted to the first optimum pixel output portion and the pixel data corresponding to the candidate blocks of the second frame/field is inputted to the second optimum pixel output portion, and the first and second optimum pixel output portions determine optimum pixel data based on the inputted pixel data corresponding to the candidate blocks of the first frame/field and the second frame/field, respectively, and
the motion compensation interpolation portion receives outputs directly from the first and second storage portions and the first and second optimum pixel output portions and generates motion compensation pixel data based on the outputs from the first storage portion, the second storage portion, the first optimum pixel output portion and the second optimum pixel output portion through a motion compensation process selected from a plurality of motion compensation processes according to a motion vector type.

27. The device of claim 26, wherein the pixel data selector generates the candidate motion vectors corresponding to the interpolated block and adjacent blocks disposed adjacent to the interpolated block.

28. The device of claim 27, wherein the number of the adjacent blocks are at least 4.

29. The device of claim 26, wherein the pixel data selector generates the pixel data corresponding to a predetermined block having a least sum of absolute difference (SAD) among candidate motion vectors as the selected pixel data.

30. The device of claim 26, wherein the pixel data selector determines the candidate blocks disposed in both the first frame/field and the second frame/field corresponding to the candidate motion vectors.

31. The device of claim 26, wherein one of the candidate motion vectors passes through the interpolated block.

32. The device of claim 26, wherein the pixel data selector determines a plurality of motion trajectories relating to corresponding blocks of the first frame/field and the second frame/field to select the pixel data.

33. The device of claim 26, wherein the first frame/field and the second frame/field are an even numbered frame/field and an odd numbered frame/field, respectively.

34. The device of claim 26, wherein the candidate motion vectors are motion vectors used to construct the first frame/field and the second frame/field.

35. The device of claim 26, wherein the interpolated block is disposed between the first field and the second field in a temporal axis.

36. The device of claim 26, wherein the pixel data comprises first pixel data selected from first blocks of the first frame/field and second pixel data selected from second blocks of the second frame/field, and the motion compensation interpolation portion generates pixel data to form the interpolated block in response to the first pixel data and the second pixel data.

37. The device of claim 36, wherein the pixel data selector generates a first median value of the first pixel data and a second median value of the second pixel data, and the motion compensation interpolation portion generates motion compensation pixel data having a median value of a combination of the first median value, the second median value, and an averaging value of the first and second pixel data to form the interpolated block.

38. The device of claim 37, wherein the motion compensation interpolation portion generates temporal average pixel data having the average value of the first pixel data and the second pixel data to form the interpolated block.

39. The device of claim 38, wherein the motion compensation interpolation portion generates motion compensation pixel data and temporal average pixel data and forms the interpolated block having a first portion of the motion compensation pixel data and a second portion of temporal average pixel data.

40. The device of claim 39, wherein the candidate motion vectors comprise one of global motion portion, a local motion portion, and a zero motion portion, and the motion compensation interpolation portion forms the interpolated block having a combination of the motion compensation pixel data and the temporal average pixel data in a predetermined ratio in response to the global motion portion, the local motion portion, and the zero motion portion of the candidate motion vectors.

41. The pixel data selection device of claim 1, wherein the first and the second optimum pixel output portions each comprise a median filter that outputs a median value of the individual pixel data.

42. The pixel data selection method of claim 11, wherein the outputting of the optimum pixel data comprises:
generating a median value of the individual pixel data.

43. The device of claim 26, wherein the pixel data selector comprises a median filter generating a median value of the candidate blocks as the selected pixel data.

* * * * *